(12) United States Patent
Lee et al.

(10) Patent No.: US 10,383,087 B2
(45) Date of Patent: Aug. 13, 2019

(54) METHOD AND APPARATUS FOR PAGING TERMINAL IN A LIGHT CONNECTION STATE IN WIRELESS COMMUNICATION SYSTEM

(71) Applicant: LG ELECTRONICS INC., Seoul (KR)

(72) Inventors: Youngdae Lee, Seoul (KR); Sangwook Han, Seoul (KR); Sangwon Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/098,426

(22) PCT Filed: May 4, 2017

(86) PCT No.: PCT/KR2017/004712
§ 371 (c)(1),
(2) Date: Nov. 1, 2018

(87) PCT Pub. No.: WO2017/192018
PCT Pub. Date: Nov. 9, 2017

(65) Prior Publication Data
US 2019/0182799 A1 Jun. 13, 2019

Related U.S. Application Data

(60) Provisional application No. 62/336,555, filed on May 13, 2016, provisional application No. 62/331,447, filed on May 4, 2016.

(51) Int. Cl.
*H04W 68/00* (2009.01)
*H04W 76/27* (2018.01)
*H04W 76/28* (2018.01)

(52) U.S. Cl.
CPC ......... *H04W 68/005* (2013.01); *H04W 76/27* (2018.02); *H04W 76/28* (2018.02)

(58) Field of Classification Search
CPC ............................ H04W 76/27; H04W 76/28; H04W 36/0033; Y02D 70/00; Y02D 70/24; Y02D 70/1262
See application file for complete search history.

(56) References Cited

U.S. PATENT DOCUMENTS

| 8,532,006 B2* | 9/2013 | Henttonen | ............ H04W 76/27 370/311 |
|---|---|---|---|
| 2013/0308548 A1 | 11/2013 | Kim et al. | |
| 2019/0037420 A1* | 1/2019 | Fujishiro | ............... H04W 4/021 |

FOREIGN PATENT DOCUMENTS

| WO | 2011139043 | 11/2011 |
| WO | 2014069961 | 5/2014 |

(Continued)

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 13)," Section 7.3 of 3GPP TS 36.304 V13.1.0, Mar. 2016, 4 pages.

(Continued)

*Primary Examiner* — Nam T Huynh
(74) *Attorney, Agent, or Firm* — Lee, Hong, Degerman, Kang & Waimey PC

(57) ABSTRACT

A light connection state is different from a substate of a radio resource control connection (RRC) state or the RRC connection state, and is a state which allows free movement of a UE in a plurality of cells without involving a handover process controlled by a network. A terminal in the RRC connection state, which has received a cell radio network temporary identity (C-RNTI) from a first cell, enters the light connection state and then moves to a second cell. The (Continued)

terminal in the light connection state receives, from the second cell, a random access reply including a temporary C-RNTI during a random access process, and replaces the C-RNTI received from the first cell with the temporary C-RNTI.

14 Claims, 8 Drawing Sheets

(56) References Cited

FOREIGN PATENT DOCUMENTS

| | | |
|---|---|---|
| WO | 2015105353 | 7/2015 |
| WO | 2015140848 | 9/2015 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 13)," Section 7.1 of 3GPP TS 36.304 V13.1.0, Mar. 2016, 3 pages.

3rd Generation Partnership Project (3GPP), "Technical Specification Group Radio Access Network; Evolved Universal Terrestrial Radio Access (E-UTRA); Medium Access Control (MAC) protocol specification (Release 13)," Section 5.7-5.7a of 3GPP TS 36.321 V13.0.0, Dec. 2015, 5 pages.

PCT International Application No. PCT/KR2017/004712, International Search Report dated Jul. 28, 2017, 6 pages.

* cited by examiner

METHOD AND APPARATUS FOR PAGING TERMINAL IN A LIGHT CONNECTION STATE IN WIRELESS COMMUNICATION SYSTEM

CROSS-REFERENCE TO RELATED APPLICATIONS

This application is the National Stage filing under 35 U.S.C. 371 of International Application No. PCT/KR2017/004712, filed on May 4, 2017, which claims the benefit of U.S. Provisional Application Nos. 62/331,447, filed on May 4, 2016, and 62/336,555, filed on May 13, 2016, the contents of which are all hereby incorporated by reference herein in their entirety.

BACKGROUND OF THE INVENTION

Field of the Invention

The present invention relates to wireless communications and, more particularly, to a method and apparatus for paging a user equipment (UE) in a light connection state in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE is a worldwide technology which has been developed due to a considerable traffic increase since its release, and which may remain even in the future. So far, most of attentions have been focused on wireless interfaces to meet demands for a greater traffic capacity and flexibility for accommodating different types of traffics. A lot of efforts have been already made to develop the wireless interfaces, and a considerable amount of efforts (e.g. an increase in spectrum efficiency due to improvement of a physical layer) are still being poured to improve a radio capacity.

However, another important aspect of traffic increase depends on the number of equipment and subsequent connection establishment between an extremely great number of user equipments (UEs) and a network through control plane signaling. In one aspect, the connection establishment between the extremely great number of UEs and the network needs to be interpreted such that there are demands for radio resources required to perform signaling through Uu interface (especially for small data transmission), and, in another aspect, it needs to be interpreted such that there are demands for a processing capacity and signaling in arranged infrastructure.

Accordingly, similarly to the relationship between a radio access network (RAN) and a core network (CN) node, need for further reducing signaling overhead between a UE and a network is emerging. To this end, a method for newly define a light connection state between the UE and the network is being discussed. As the light connection state between the UE and the network is defined, as for the UE which frequently (re)establishes connection to the network, the network may consumes less signaling processing efforts and hence use a more capacity for traffic increase.

However, if the light connection state between the UE and the network is defined, an issue necessary to be addressed additionally may occur.

SUMMARY OF THE INVENTION

The present invention provides a method and apparatus for paging a user equipment (UE) in a light connection state in a wireless communication system. The present invention provides a method and an apparatus for paging a UE in a light connection state by use of discontinuous reception (DRX). The present invention provides a method and an apparatus for replacing a stored cell radio network temporary identity (C-RNTI) with a temporary C-RNTI received from a new serving cell when a UE in a light connection state receives paging and performs a random access procedure with respect to the new serving cell.

In an aspect, a method for operating a user equipment (UE) in a light connection state in a wireless communication system is provided. The method includes while being in a first state, receiving a cell radio network temporary identity (C-RNTI) from a first cell, entering from the first state to a second state, while being in the second state, moving to a second cell, during a random access procedure, receiving a random access response including a temporary C-RNTI from the second cell, and replacing the C-RNTI received from the first cell with the temporary C-RNTI included in the random access response. The first state is a RRC_CONNECTED state, the second state is the light connection state, which is either a substate of the RRC_CONNECTED state or a different state than the RRC_CONNECTED state, and, in the second state, the UE is allowed to move autonomously across a plurality of cells without a handover procedure controlled by a network.

In another aspect, a user equipment (UE) in a light connection state in a wireless communication system is provided. The UE includes a memory, a transceiver, and a processor, operably coupled to the memory and the transceiver, that, while being in a first state, controls the transceiver to receive a cell radio network temporary identity (C-RNTI) from a first cell, enters from the first state to a second state, while being in the second state, moves to a second cell, during a random access procedure, controls the transceiver to receive a random access response including a temporary C-RNTI from the second cell, and controls the transceiver to replace the C-RNTI received from the first cell with the temporary C-RNTI included in the random access response. The first state is a RRC_CONNECTED state, the second state is the light connection state, which is either a substate of the RRC_CONNECTED state or a different state than the RRC_CONNECTED state, and, in the second state, the UE is allowed to move autonomously across a plurality of cells without a handover procedure controlled by a network.

When the UE in the light connection state moves to a new cell, a signaling overhead can be reduced and paging can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
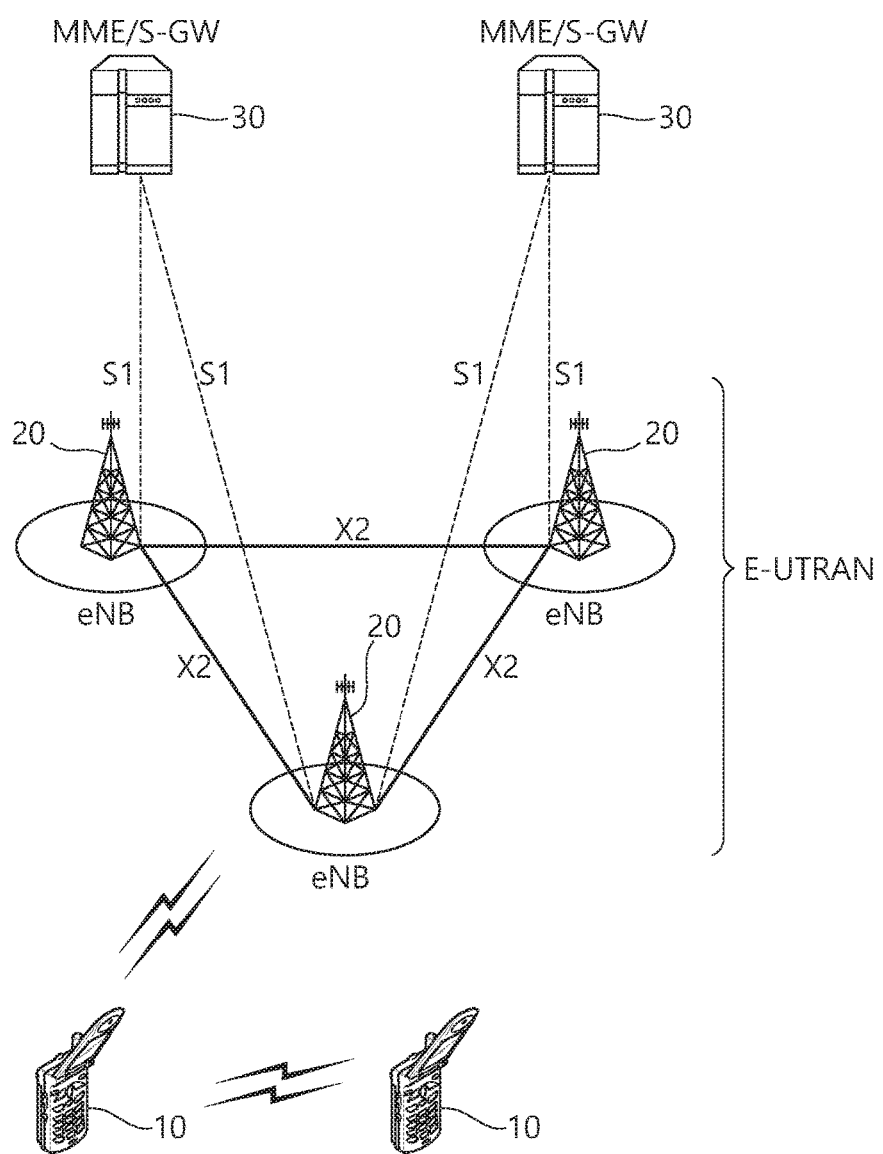
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
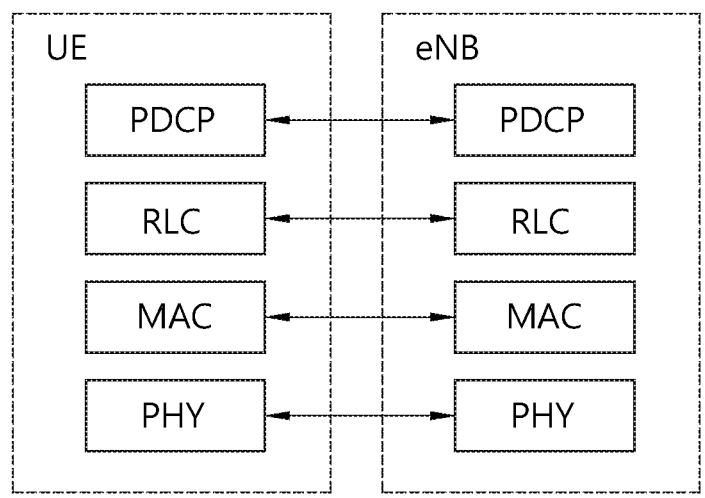
FIG. 2 shows a block diagram of a user plane protocol stack of an LTE system.
Figure 3:
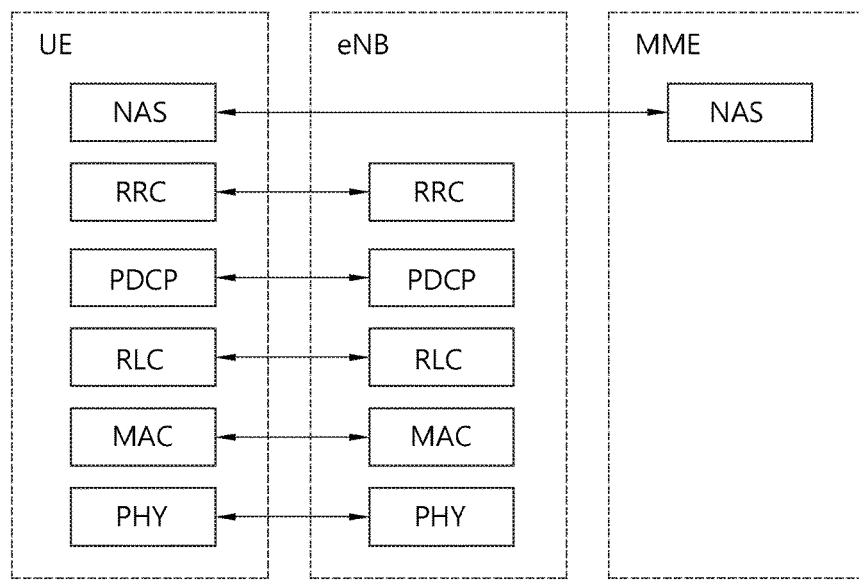
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

A NAS layer above the RRC layer performs functions of session management and mobility management. In order to manage mobility of a UE in the NAS layer, an EPS mobility management (EMM) registered state (EMM-REGISTERED) and an EMM deregistered state (EMM-DEREGISTERED) may be defined. The EMM registered state and the EMM deregistered state may apply to a UE and an MME. The UE is initially in the EMM deregistered state. The EMM deregistered state refers to a state in which the UE is not attached to the network, and in which the MME does not know the current position of the UE and may have TA information lastly reported by the UE in the last attach. In order to attach the network, this UE performs a process for registering to the corresponding network through an initial attach procedure. If the attach procedure is performed completely, the UE and the MME are rendered in the EMM registered state. The EMM registered state refers to a state in which the UE attaches to the network and has an IP address and in which EPS Bear is set, the MME may know which cell the UE is currently located or at least which TA the UE is currently located.

In addition, in order to manage signaling connection between a UE and an EPC, an EPS connection management (ECM) idle state (ECM-IDLE) and an ECM connection state (ECM-CONNECTED) may be defined. Even the ECM idle state and the ECM connected state may apply to the UE and the MME. The ECM idle state refers to a state in which ECM connection is not established such that the UE is not allocated with a physical resource, such as a signaling radio bearer (SRB)/data radio bearer (DRB), and a network resource (S1 bearer/S1 signaling connection resource). Thus, without receiving a command from the network, the UE in the ECM idle state may perform a UE-based mobility management-related procedure such as cell selection or cell reselection. If a UE in the ECM idle state establishes RRC connection with the network, the corresponding UE is rendered into an ECM connected state. If an MME in the ECM idle state establishes S1 connection with the network, the corresponding MME is rendered into an ECM connected state. The ECM connected state refers to a state in which the ECM connection is established such that a UE is allocated with a physical resource, such as a radio resource (SRB/DRB) and a network resource (S1 bearer/S1 signaling connection resource). When the UE is in the ECM connected state, mobility of the UE is managed by a command from the network. If a location of the UE in the ECM idle state is changed from a location the network knows, the UE may inform the location thereof to the network through a TAU procedure.

Figure 4:
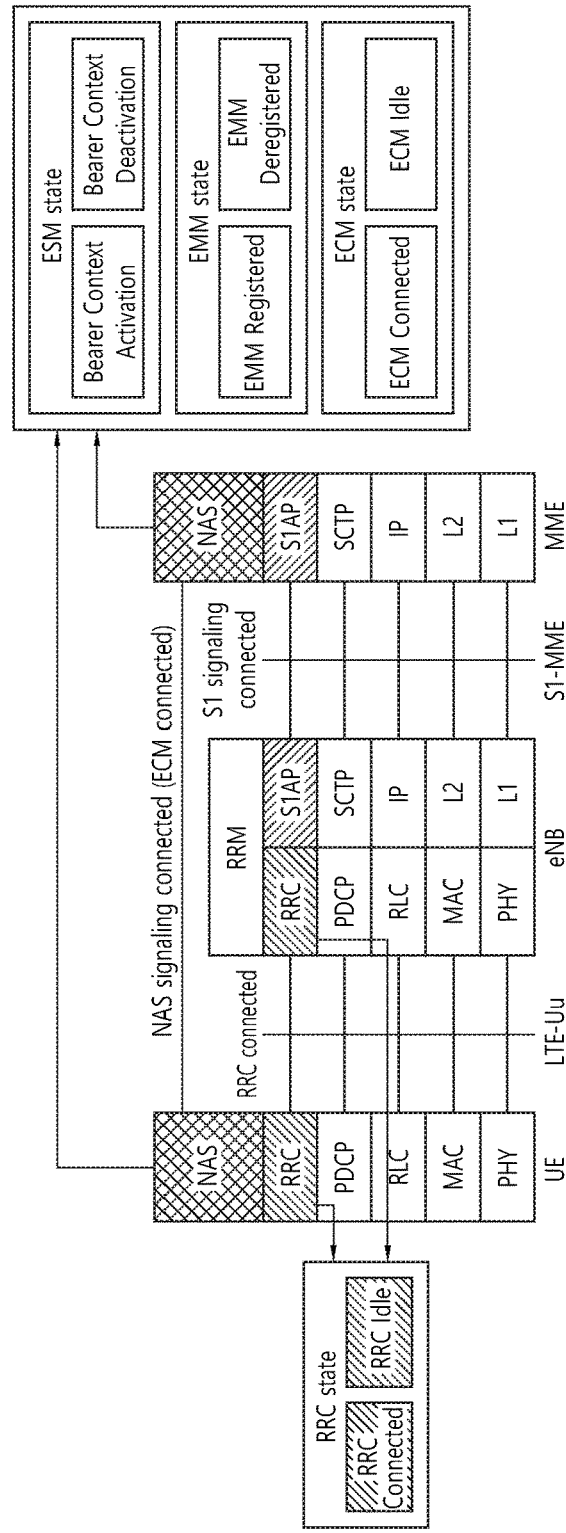
FIG. 4 shows EMM, ECM, and RRC states.

FIG. 4 shows EMM, ECM, and RRC states. Referring to FIG. 4, RRC connection which enables transmission of an RRC message may be established between a UE and an eNB. The RRC connected state may be classified into RRC_CONNECTED and RRC_IDLE depending on whether or not RRC connection is established. In addition, an ECM connection which enables transmission of an NAS message may be established between a UE and an MME. The ECM connection is a logical connection, and may consist of RRC connection which is established between an UE and the eNB and S1 signaling connection that is established between an eNB and an MME. That is, establishment/release of ECM connection means establishment/release of both the RRC connection and the S1 signaling connection. When the ECM connection is established, RRC connection may be established as for the UE and S1 signaling connection is established as for the MME. The ECM connected state may be classified into ECM_CONNECTED and ECM_IDLE depending on whether or not ECM connection is established. The EMM may be classified into EMM_REGISTERED and EMM_DEREGISTERED depending on whether or not the UE is attached to the network.

Hereinafter, a discontinuous reception (DRX) is described. It may be referred to as Section 5.7 of 3GPP TS 36.321 V13.0.0 (2015-12). The MAC entity may be configured by RRC with a DRX functionality that controls the UE's PDCCH monitoring activity for the MAC entity's cell RNTI (C-RNTI), transmit power control physical uplink control channel RNTI (TPC-PUCCH-RNTI), TPC physical uplink shared channel RNTI (TPC-PUSCH-RNTI), semi-persistent scheduling (SPS) C-RNTI (if configured), enhanced interfernce mitigation and traffic adaptation (eIMTA)-RNTI (if configured) and sidelink RNTI (SL-RNTI) (if configured). When in RRC_CONNECTED, if DRX is configured, the MAC entity is allowed to monitor the PDCCH discontinuously using the DRX operation. Otherwise, the MAC entity monitors the PDCCH continuously. RRC controls DRX operation by configuring the timers onDurationTimer, drx-InactivityTimer, drx-Retransmission Timer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined.

When a DRX cycle is configured, the active time includes the time while:
    onDurationTimer or drx-InactivityTimer or drx-Retransmission Timer or mac-ContentionResolution Timer is running; or
    a scheduling request is sent on PUCCH and is pending; or
    an uplink grant for a pending HARQ retransmission can occur and there is data in the corresponding HARQ buffer; or
    a PDCCH indicating a new transmission addressed to the C-RNTI of the MAC entity has not been received after successful reception of a random access response for the preamble not selected by the MAC entity.

When DRX is configured, the MAC entity shall for each subframe:
1> if a HARQ RTT Timer expires in this subframe and the data of the corresponding HARQ process was not successfully decoded:
  2> start the drx-RetransmissionTimer for the corresponding HARQ process.
1> if a DRX command MAC control element (CE) or a long DRX command MAC CE is received:
  2> stop onDurationTimer;
  2> stop drx-InactivityTimer.
1> if drx-InactivityTimer expires or a DRX command MAC CE is received in this subframe:
  2> if the short DRX cycle is configured:
    3> start or restart drxShortCycleTimer;
    3> use the short DRX Cycle.
  2> else:
    3> use the long DRX cycle.
1> if drxShortCycleTimer expires in this subframe:
  2> use the long DRX cycle.
1> if a long DRX command MAC CE is received:
  2> stop drxShortCycleTimer;
  2> se the long DRX cycle.

1> If the short DRX Cycle is used and [(SFN*10)+subframe number] modulo (shortDRX-Cycle)=(drxStartOffset) modulo (shortDRX-Cycle); or 1> if the long DRX Cycle is used and [(SFN*10)+subframe number] modulo (long DRX-Cycle)=drxStartOffset:

2> start onDurationTimer.

1> during the active time, for a PDCCH-subframe, if the subframe is not required for uplink transmission for half-duplex frequency division duplex (FDD) UE operation, if the subframe is not a half-duplex guard subframe and if the subframe is not part of a configured measurement gap and if the subframe is not part of a configured sidelink discovery gap for reception; or 1> during the active time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId and if the subframe is not part of a configured measurement gap and if the subframe is not part of a configured sidelink discovery gap for reception; or 1> during the active time, for a subframe other than a PDCCH-subframe and for a UE not capable of simultaneous reception and transmission in the aggregated cells, if the subframe is a downlink subframe indicated by a valid eIMTA L1 signalling for the special cell (SpCell) and if the subframe is not part of a configured measurement gap and if the subframe is not part of a configured sidelink discovery gap for reception:

2> monitor the PDCCH;

2> if the PDCCH indicates a DL transmission or if a DL assignment has been configured for this subframe:

3> start the HARQ RTT Timer for the corresponding HARQ process;

3> stop the drx-Retransmission Timer for the corresponding HARQ process.

2> if the PDCCH indicates a new transmission (DL, UL or SL):

3> start or restart drx-InactivityTimer.

1> in current subframe n, if the MAC entity would not be in active time considering grants/assignments/DRX command MAC CEs/long DRX command MAC CEs received and scheduling request sent until and including subframe n−5 when evaluating all DRX active time conditions, type-0-triggered sounding reference signal (SRS) shall not be reported.

1> if CQI masking (cqi-Mask) is setup by upper layers:

2> in current subframe n, if onDurationTimer would not be running considering grants/assignments/DRX command MAC CEs/long DRX command MAC CEs received until and including subframe n−5 when evaluating all DRX active time conditions, CQI/precoding matrix indicator (PMI)/radnk indicator (RI)/precoding type indicator (PTI) on PUCCH shall not be reported.

1> else:

2> in current subframe n, if the MAC entity would not be in active time considering grants/assignments/DRX command MAC CEs/long DRX command MAC CEs received and scheduling request sent until and including subframe n−5 when evaluating all DRX active time conditions, CQI/PMI/RI/PTI on PUCCH shall not be reported.

Regardless of whether the MAC entity is monitoring PDCCH or not, the MAC entity receives and transmits HARQ feedback and transmits type-1-triggered SRS when such is expected.

Hereinafter, a DRX for SC-PTM is described. It may be referred to as Section 5.7a of 3GPP TS 36.321 V13.0.0 (2015-12). In addition to the conventional DRX operation, the UE may perform DRX operation for SC-PTM.

Each G-RNTI of the MAC entity may be configured by RRC with a DRX functionality that controls the UE's PDCCH monitoring activity for this G-RNTI. When in RRC_IDLE or RRC_CONNECTED, if DRX is configured, the MAC entity is allowed to monitor the PDCCH for this G-RNTI discontinuously using the DRX operation. Otherwise, the MAC entity monitors the PDCCH for this G-RNTI continuously. For each G-RNTI of the MAC entity, RRC controls its DRX operation by configuring the timers onDurationTimerSCPTM, drx-InactivityTimerSCPTM, the SC-MTCH-SchedulingCycle and the value of the SC-MTCH-Scheduling Offset. The DRX operation for SC-PTM is performed independently for each G-RNTI and independently from the conventional DRX operation.

When DRX is configured for a G-RNTI, the active time includes the time while:

onDurationTimerSCPTM or drx-InactivityTimerSCPTM is running.

When DRX is configured for a G-RNTI, the MAC entity shall for each subframe f or this G-RNTI:

1> if [(SFN*10)+subframe number] modulo (SC-MTCH-SchedulingCycle)=SC-MTCH-SchedulingOffset:

2> start onDurationTimerSCPTM.

1> during the active time, for a PDCCH-subframe:

2> monitor the PDCCH;

2> if the PDCCH indicates a DL transmission:

3> start or restart drx-InactivityTimerSCPTM.

Hereinafter, a DRX for paging is described. It may be referred to as Section 7.1 of 3GPP TS 36.304 V13.1.0 (2016-03). The UE may use DRX in idle mode in order to reduce power consumption. One paging occasion (PO) is a subframe where there may be paging RNTI (P-RNTI) transmitted on PDCCH or machine-type communicaiton (MTC) PDCCH (MPDCCH) addressing the paging message. In P-RNTI transmitted on MPDCCH case, PO refers to the starting subframe of MPDCCH repetitions. One paging frame (PF) is one radio Frame, which may contain one or multiple paging occasion(s). When DRX is used the UE needs only to monitor one PO per DRX cycle. One paging narrowband (PNB) is one narrowband, on which the UE performs the paging message reception.

PF, PO, and PNB are determined by following formulae using the DRX parameters provided in System Information. First, PF is given by Equation 1.

$$SFN \bmod T = (T \text{ div } N) * (UE\_ID \bmod N) \qquad \text{[Equation 1]}$$

Index i_s pointing to PO from subframe pattern will be derived from Equation 2.

$$i\_s = \text{floor}(UE\_ID/N) \bmod Ns \qquad \text{[Equation 2]}$$

If P-RNTI is monitored on MPDCCH, the PNB is determined by Equation 3.

$$PNB = \text{floor}(UE\_ID/(N*Ns)) \bmod Nn \qquad \text{[Equation 3]}$$

System Information DRX parameters stored in the UE shall be updated locally in the UE whenever the DRX parameter values are changed in SI. If the UE has no international mobile subscriber identity (IMSI), for instance when making an emergency call without universal subscriber identification module (USIM), the UE shall use as default identity UE_ID=0 in Equation 1 to 3 above.

The following parameters are used in Equation 1 to 3 above.

T: DRX cycle of the UE. If a UE specific extended DRX value of 512 radio frames is configured by upper layers, T=512. Otherwise, T is determined by the shortest of the UE specific DRX value, if allocated by upper layers, and a default DRX value broadcast in system information. If UE specific DRX is not configured by upper layers, the default value is applied.

nB: 4T, 2T, T, T/2, T/4, T/8, T/16, T/32.

N: min(T,nB)

Ns: max(1,nB/T)

Nn: number of paging narrowbands provided in system information

UE_ID: IMSI mod 1024, if P-RNTI is monitored on PDCCH, and IMSI mod 16384, if P-RNTI is monitored on MPDCCH.

Hereinafter, paging in extended DRX is described. It may be referred to as Section 7.3 of 3GPP TS 36.304 V13.1.0 (2016-03). The UE may be configured by upper layers with an extended DRX (eDRX) cycle $T_{eDRX}$. The UE may operate in extended DRX only if the cell indicates support for eDRX in system information.

If the UE is configured with a $T_{eDRX}$ cycle of 512 radio frames, it monitors POs according Equations 1 and 2 with parameter T=512. Otherwise, a UE configured with eDRX monitors POs according Equations 1 and 2 based on the upper layer configured DRX value and a default DRX value, during a periodic paging time window (PTW) configured for the UE or until a paging message including the UE's NAS identity is received for the UE during the PTW, whichever is earlier. The PTW is UE-specific and is determined by a paging hyperframe (PH), a starting position within the PH (PTW_start) and an ending position (PTW_end). PH, PTW_start and PTW_end are given by the following formulae.

The PH is the hyper system frame number (H-SFN) satisfying Equation 4.

$$H\text{-}SFN \bmod T_{eDRX,H} = (UE\_ID \bmod T_{eDRX,H})$$

In Equation 4, UE_ID is IMSI mod 1024. $T_{eDRX,H}$ is eDRX cycle of the UE in hyper-frames. $T_{eDRX,H}=1, 2, \ldots, 256$ hyper-frames and configured by upper layers.

PTW_start denotes the first radio frame of the PH that is part the PTW and has SFN satisfying Equation 5.

$$SFN = 256 * i_{eDRX} \quad \text{[Equation 5]}$$

In Equation 5, $i_{eDRX} = \text{floor}(UE\_ID/T_{eDRX,H}) \bmod 4$.

PTW_end is the last radio frame of the PTW and has SFN satisfying Equation 6.

$$SFN = (PTW\_start + L * 100 - 1) \bmod 1024 \quad \text{[Equation 6]}$$

In Equation 6, L is paging time window length configured by upper layers.

Hereinafter, light connection (LC) newly defined between a UE and a network is described. The light connection is a substate of RRC_CONNECTED (and ECM-CONNECTED) introduced to reduce a signaling overhead between the UE and the network. This characteristic may be more properly adopted for data traffic pattern and high-speed access establishment. Due to introduction of the light connection, signaling and processes may be reduced and this may reduce a delay of data arrival. Among other factors, a battery life of the UE may be reduced by an amount of control plane signaling. As the signaling overhead is reduced, battery consumption of the UE may be inevitably increased.

Since the light connection is a substate of RRC_CONNECTED and ECM-CONNECTED, ECM connection between the UE and an MME is established. Thus, RRC connection between the UE and the eNB is established and also S1 connection between the eNB and the MME is established. Thus, mobility processing of the UE may be limited in a radio access network (RAN) level not on a core network (CN) level. That is, the UE does not perform handover when moving between cells (i.e. the UE may perform cell reselection rather than establishing RRC connection with a new serving cell), and freely move in a predetermined area without informing an anchor eNB of the handover. By limiting mobility processing of the UE on the RAN level, it is possible to further reduce network interface signals.

In addition, since the S1 connection between the eNB and the MME is established, RAN-based paging rather than CN-based paging is performed. That is, the eNB, not the MME, may page the UE. In consideration of UE mobility and a traffic pattern, RAN-based paging processing and configuration may provide more optimal and dynamic settings for parameters therefor.

Hereinafter, a method for paging a UE in a light connection state according to an embodiment of the present invention is described. The present invention proposes how a UE operates to reduce paging signaling and RRC connection signaling when the UE in a light connection state moves to a new serving cell.

Figure 5:
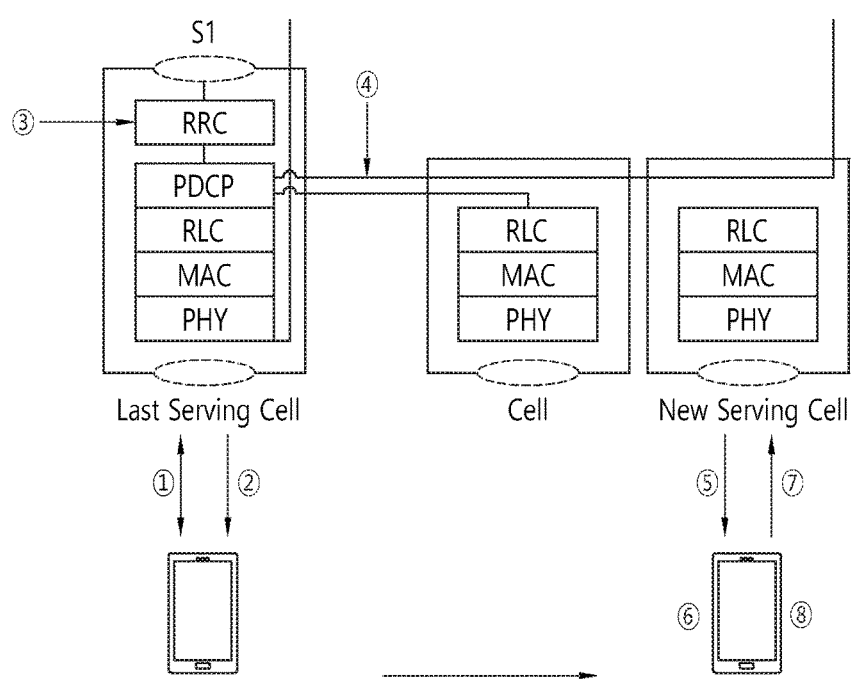
FIG. 5 shows a method for paging a UE in a light connection state according to an embodiment of the present invention.

FIG. 5 shows a method for paging a UE in a light connection state according to an embodiment of the present invention. According to the embodiment shown in FIG. 5, the UE in the light connection state operates as a connected mode DRX (CDRX) which is called a light connection DRX (LCDRX), and the UE is configured by RRC with a light connection DRX function for controlling monitoring of a PDCCH of the UE for the P-RNTI and SL-RNTI (if configured). The UE does not release a dedicated DRX configuration when entering into the light connection state, and may maintain the corresponding DRX configuration in the light connection state. In addition, the last serving cell may provide the dedicated DRX configuration to every cell included in a cell list.

(1) First, the UE is in the RRC_CONNECTED state.

(2) In the embodiment of FIG. 5, it is assumed that the network switches the UE in the RRC_CONNECTED state to a light connection state. Or, the UE may autonomously enter from the RRC_CONNECTED state to the light connection state. The light connection state may be regarded, as described above, a substate of RRC_CONNECTED or a state different from RRC_CONNECTED. When the UE switches to the light connection state, a cell list may be provided to the UE. The UE in the light connection state may freely move in cells included in the corresponding cell list, without a handover procedure or reporting a measurement result. In the embodiment of FIG. 5, the network may be called a source cell or the last serving cell. An eNB providing the source cell or the last serving cell may be called the last serving eNB. The UE may store cell ID and C-RNTI provided from the last serving cell.

(3) A CN (e.g. S-GW) transmits DL data of the UE in the light connection state to the last serving eNB in which S1 connection of the UE is maintained by the light connection. Accordingly, the RRC layer of the last serving eNB receives paging for the UE in the light connection state from the CN, (4) Having received the paging from the CN, the last serving eNB generates a paging message and transmits the paging message to every cell included in the cell list. In addition, the last serving eNB may transmit at least one of the UE's C-RNTI, serving cell ID, and/or dedicated DRX pattern to every cell included in the cell list. Every cell included in the cell list may page the UE according to the dedicated DRX configuration for the UE.

If the UE is enabled to perform coverage enhancement, the last serving eNB may additionally provide the most recently known coverage enhancement level of the UE. In addition, the last serving eNB may provide the number of times of paging attempts, which indicates how many times paging transmission have been attempted as for the last serving eNB, to every cell included in the cell list. With this information, each cell having received a paging message from the last serving eNB may page the UE using a coverage enhancement technique (e.g. repetition).

(5) The UE moves out of the last serving cell. In the cells included in the cell list, during MAC DRX activation time, the UE in the light connection state monitors only a PDCCH which is addressed only by several limited RNTI (e.g. P-RNTI). The paging message includes ID of the paged UE. The ID of the paged UE may be a combination of source cell ID and C-RNTI. The C-RNTI may be provided lastly when the network switches the UE to the light connection state in the above step (2). The ID of the paged UE may be one of the following two options.

Option 1: C-RNTI+source cell ID index in the cell list (or source cell ID). The UE monitors a PDCCH using P-RNTI on its paging opportunity.

Option 2: C-RNTI of a particular subframe mapped to the source cell ID. In this case, the UE monitors a PDCCH using P-RNTI in the particular subframe mapped to the source cell ID (or a source cell ID index in the cell list).

(6) When the ID of the UE exists in the paging message, the UE receives the paging message. The ID of the UE may be a combination of a source cell Id and C-RNTI. When the UE receives the paging message, the UE may also monitor a PDCCH which is addressed by another RNTI.

(7) When the UE in the light connection state receives a paging message from a new serving cell, the UE may perform a random access procedure and transmit stored C-RNTI (i.e. C-RNTI received from the last serving cell) and cell ID included in message 3. When the UE in the light connection state receives a paging message from the last serving cell, the UE performs a legacy random access procedure.

(8) When the UE is located in a new serving cell, the UE and the new serving base station may successfully complete the random access procedure and then replace the stored C-RNTI with temporary C-RNTI included in a random access response message.

Meanwhile, when the eNB receives the C-RNTI and the cell ID due to the random access procedure in the light connection state, a new serving eNB may inform new serving cell ID of the UE in the light connection state as the last serving eNB, for example, through X2 interface. The last serving eNB maintains the position of the UE in the light connection state. Through the X2 interface, the new serving eNB brings context of the UE from an eNB to which the UE is previously attached. In addition, selectively, the new serving eNB may trigger a path switching procedure or the last serving eNB may trigger the path switching procedure after transmitting DL data and UE content.

The above steps (7) and (8) may be applied even when the NAS layer requests RRC connection establishment with respect to a mobile originating (MO) signal/data while the UE is in the light connection state. More specifically, if the NAS layer requests RRC connection establishment with respect to the MO signal/data while the UE is in the light connection state, the UE may inform stored C-RNTI and ID of the last serving cell to the current serving cell.

If the UE in the light connection state selects a cell not included in a cell list, the UE may switch to RRC_CONNECTED in order to receive a new cell list. To this end, a new establishment reason may be needed. On the contrary, the UE may request a new cell list after completion of RRC connection establishment.

In the above description, a cell ID may be any one of the following.

Physical cell ID (PCI)
Cell ID used to distinguish a cell in the PLMN clearly.
E-UTRAN cell ID (ECI)
E-UTRAN cell global ID (ECGI)

Figure 6:
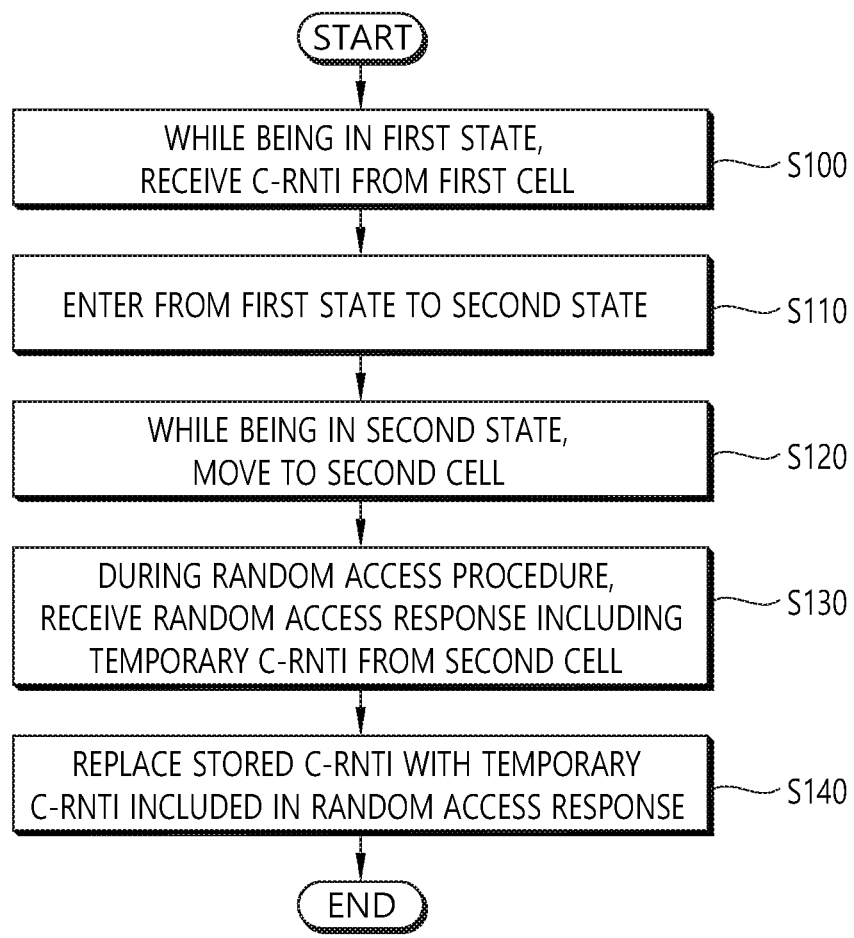
FIG. 6 shows a method for operating a UE in a light connection state according to an embodiment of the present invention.

FIG. 6 shows a method for operating a UE in a light connection state according to an embodiment of the present invention. The above description of the present invention may apply to the embodiment of FIG. 6.

In step S100, a UE receives cell radio network temporary identity (C-RNTI) from a first cell while being in a first state. The first state may be an RRC_CONNECTED state (RRC_CONNECTED). The UE in the light connection state may receive a cell list including a plurality of cells from the first cell.

In step S110, the UE enters from the first state to a second state. The second state is a light connection state described in the present invention, and the second state may be a substate of the RRC CONNECTED state or a state different from the RRC CONNECTED state, and may be a state in which the UE is allowed to freely move in the plurality of cells without a handover procedure controlled by a network. In step S120, the UE moves to the second cell while being in the second state. The plurality of cells may include the second cell.

In order to receive a paging message transmitted from the second cell, the UE in the second state may monitor a PDCCH which is addressed to a P-RNTI. The paging message may include ID of the UE. The ID of the UE may be a combination of ID of the first cell and the C-RNTI. The UE may receive the paging message transmitted from the second cell.

In step S130, the UE may receive a random access response including temporary C-RNTI from the second cell during a random access procedure. In addition, the UE may transmit Message 3 including C-RNTI, received from the first cell, to the second cell.

In step S140, the UE replaces the C-RNTI, received from the first cell, by the temporary C-RNTI included in the random access response. After the random access procedure is successfully completed, the UE may replace the C-RNTI, received from the first cell, by the temporary C-RNTI included in the random access response.

In order to perform a random access procedure on a CCCH service data unit (SDU), the UE in the light connection state may store ECI and C-RNTI received from a previously attached cell. If the CCCH SDU about the UE in the light connection state is included in Message 3 and PDCCH transmission is addressed by the temporary C-RNTI:

1> when a MAC protocol data unit (PDU) is successfully decoded:
 2) stops mac-ContentionResolutionTimer;
 2> when the MAC PDU carries UE contention resolution ID MAC control element (CE);

2> when the UE contention resolution ID included in the MAC CE matches with the CCCH SDU for the UE in the light connection state, which is transmitted through Message 3:

3> regard this contention resolution as being successful, and complete release and demultiplexing of the MAC PDU.
3> set the C-RNTI as a value of the temporary C-RNTI;
3> dispose the temporary C-RNTI;
3> regard this random access procedure as being successfully completed.
2> otherwise:
3> dispose the temporary C-RNTI;
3> regard this contention resolution as not being successful, and dispose the successfully decoded MAC PDU.

Figure 7:
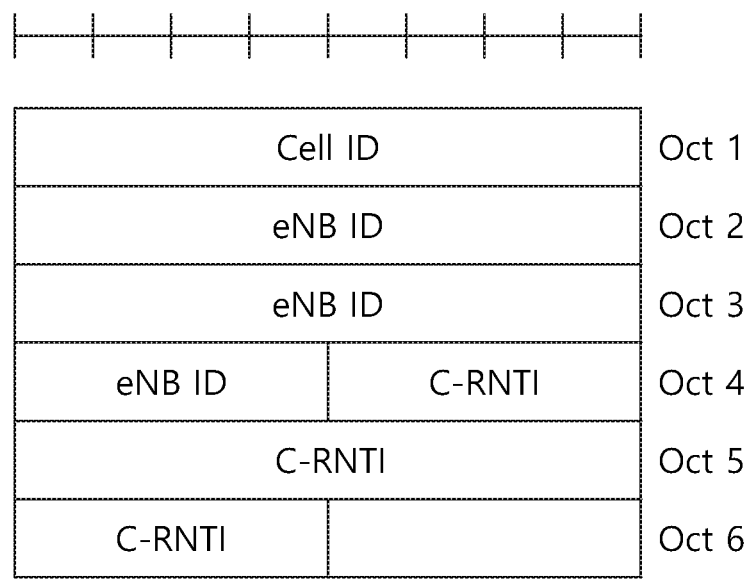
FIG. 7 shows an example of a UE contention resolution ID MAC CE for light connection according to an embodiment of the present invention.

FIG. 7 shows an example of a UE contention resolution ID MAC CE for light connection according to an embodiment of the present invention. The UE contention resolution ID MAC CE for light connection may be identified by an MAC PDU subheader. Referring to FIG. 7, the UE contention resolution ID MAC CE for a light connection state includes new ID of 44 bits. The new ID of 44 bits is comprised of ECI of 28 bits and C-RNTI of 16 bits. The ECI is ID used to uniquely identify a cell in a PLMN. The ECI of 28 bits is comprised of eNB ID of 20 bits and cell ID of 8 bits. The eNB ID is ID used to uniquely identify an eNB in the PLMN.

Meanwhile, the question may be how to handle a paging message by the eNB to the UE in the light connection state. In the above-described embodiment of the present invention, it is assumed that the last serving eNB, i.e. a source eNB, generates a paging message, but the paging message transmitted to the UE in the light connection state may be usually generated by the following options.

Option 1: generated by the last serving eNB (i.e. a source eNB)
Option 2: generated by the current eNB (i.e. a target eNB)

In addition, the following options may be considered when it comes to how the source eNB transmits a paging message to a target eNB.

Option 1: PCCH
1) Option 1-1: the source eNB may generate an RRC paging message through a PCCH, and transmit a PDCP SDU to the target eNB.
2) Option 1-2: the source eNB generates an inter-node RRC message including paging, and the target eNB may generate an RRC paging message to be transmitted through the PCCH.

Option 2: DCCH
1) Option 2-1: the source eNB generates an RRC paging message through a DCCH and transmits a PDCP SDU to the target eNB. In this case, the RRC paging message may be encrypted based on a source eNB key.
2) Option 2-2: The source eNB may generate an inter-node RRC message including paging, and the target eNB may generate an RRC paging message to be transmitted through a DCCH. In this case, the RRC paging message may be encrypted based on a target eNB key. However, the UE is not capable of decrypting this message, and this option may not be implementable.

Figure 8:
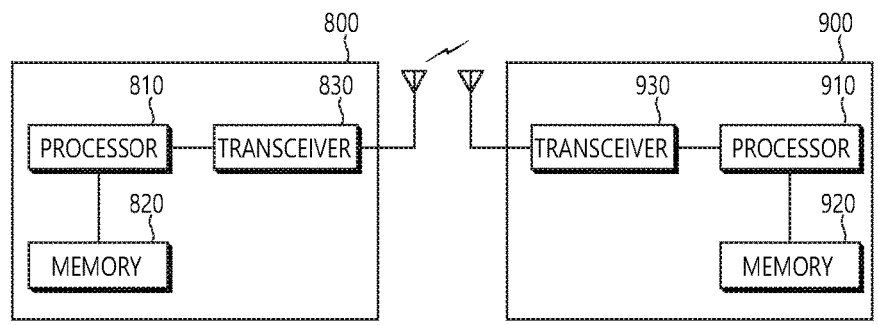
FIG. 8 shows a wireless communication system to implement an embodiment of the present invention.

FIG. 8 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for operating a user equipment (UE) in a light connection state in a wireless communication system, the method comprising:
  while being in a first state, receiving a cell radio network temporary identity (C-RNTI) from a first cell;
  entering from the first state to a second state;
  while being in the second state, moving to a second cell;
  during a random access procedure, receiving a random access response including a temporary C-RNTI from the second cell; and
  replacing the C-RNTI received from the first cell with the temporary C-RNTI included in the random access response,
  wherein the first state is a RRC_CONNECTED state,
  wherein the second state is the light connection state, which is either a substate of the RRC_CONNECTED state or a different state than the RRC_CONNECTED state, and
  wherein, in the second state, the UE is allowed to move autonomously across a plurality of cells without a handover procedure controlled by a network.

2. The method of claim 1, further comprising receiving a cell list including the plurality of cells from the first cell.

3. The method of claim 1, further comprising monitoring a physical downlink control channel (PDCCH) addressed by a paging RNTI (P-RNTI) to receive a paging message transmitted from the second cell.

4. The method of claim 3, wherein the paging message includes an identity (ID) of the UE.

5. The method of claim 4, wherein the ID of the UE is a combination of an ID of the first cell and the C-RNTI.

6. The method of claim 3, further comprising receiving the paging message transmitted from the second cell.

7. The method of claim 1, further comprising transmitting a message 3 including the C-RNTI received from the first cell to the second cell, during the random access procedure.

8. The method of claim 1, wherein the C-RNTI received from the first cell is replaced with the temporary C-RNTI included after the random access procedure is successfully completed.

9. The method of claim 1, wherein the plurality of cells includes the second cell.

10. A user equipment (UE) in a light connection state in a wireless communication system, the UE comprising:
   a memory;
   a transceiver; and
   a processor, operably coupled to the memory and the transceiver, that:
   while being in a first state, controls the transceiver to receive a cell radio network temporary identity (C-RNTI) from a first cell,
   enters from the first state to a second state,
   while being in the second state, moves to a second cell,
   during a random access procedure, controls the transceiver to receive a random access response including a temporary C-RNTI from the second cell, and
   controls the transceiver to replace the C-RNTI received from the first cell with the temporary C-RNTI included in the random access response,
   wherein the first state is a RRC_CONNECTED state,
   wherein the second state is the light connection state, which is either a substate of the RRC_CONNECTED state or a different state than the RRC_CONNECTED state, and
   wherein, in the second state, the UE is allowed to move autonomously across a plurality of cells without a handover procedure controlled by a network.

11. The UE of claim 10, wherein the processor controls the transceiver to receive a cell list including the plurality of cells from the first cell.

12. The UE of claim 10, wherein the processor monitors a physical downlink control channel (PDCCH) addressed by a paging RNTI (P-RNTI) to receive a paging message transmitted from the second cell.

13. The UE of claim 12, wherein the paging message includes an identity (ID) of the UE.

14. The UE of claim 10, wherein the processor controls the transceiver to transmit a message 3 including the C-RNTI received from the first cell to the second cell, during the random access procedure.

* * * * *